US010021627B2

(12) United States Patent
Goto

(10) Patent No.: US 10,021,627 B2
(45) Date of Patent: Jul. 10, 2018

(54) COMMUNICATION DEVICE, COMMUNICATION METHOD, AND STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/690,830

(22) Filed: Aug. 30, 2017

(65) Prior Publication Data

US 2017/0367034 A1    Dec. 21, 2017

Related U.S. Application Data

(63) Continuation of application No. 15/211,950, filed on Jul. 15, 2016, now Pat. No. 9,769,734.

(30) Foreign Application Priority Data

Jul. 21, 2015   (JP) .................. 2015-144394

(51) Int. Cl.
| H04B 7/00 | (2006.01) |
| H04W 48/14 | (2009.01) |
| G06K 19/06 | (2006.01) |
| G06K 7/14 | (2006.01) |
| H04W 12/06 | (2009.01) |
| H04L 29/06 | (2006.01) |
| G06F 17/30 | (2006.01) |
| H04W 88/02 | (2009.01) |
| H04W 92/10 | (2009.01) |
| H04W 84/12 | (2009.01) |

(52) U.S. Cl.
CPC ...... *H04W 48/14* (2013.01); *G06F 17/30725* (2013.01); *G06K 7/1417* (2013.01); *G06K 19/06037* (2013.01); *H04L 63/18* (2013.01); *H04W 12/06* (2013.01); *H04W 84/12* (2013.01); *H04W 88/02* (2013.01); *H04W 92/10* (2013.01)

(58) Field of Classification Search
USPC .............................. 455/41.1–41.3
See application file for complete search history.

(56) References Cited

U.S. PATENT DOCUMENTS

| 2005/0054369 A1* | 3/2005 | Murakami | ............ H04W 40/24 |
| | | | 455/525 |
| 2008/0136621 A1* | 6/2008 | Malik | .................. H04W 48/14 |
| | | | 340/539.1 |

(Continued)

*Primary Examiner* — Fayyaz Alam
(74) *Attorney, Agent, or Firm* — Canon U.S.A., Inc. IP Division

(57) ABSTRACT

A communication device acquires information relating to a first access point from a captured first image, and acquires information relating to a second access point from a captured second image. The communication device then starts communication parameter share processing of sharing a communication parameter, required for establishing a wireless network, with respect to the first access point or the second access point. The communication device starts the communication parameter share processing with respect to the second access point in response to reception of a completion notification indicative of completion of the communication parameter share processing with respect to the first access point, from the first access point.

10 Claims, 10 Drawing Sheets

(56) References Cited

U.S. PATENT DOCUMENTS

| | | | |
|---|---|---|---|
| 2011/0093704 A1* | 4/2011 | Park | H04L 63/102 |
| | | | 713/168 |
| 2013/0223279 A1* | 8/2013 | Tinnakornsrisuphap | H04L 41/0809 |
| | | | 370/254 |
| 2013/0246794 A1* | 9/2013 | Brown | H04L 9/0844 |
| | | | 713/171 |
| 2013/0251151 A1* | 9/2013 | Yamada | H04L 9/0877 |
| | | | 380/270 |
| 2014/0162600 A1* | 6/2014 | Chang | H04W 12/06 |
| | | | 455/411 |
| 2014/0187163 A1* | 7/2014 | Fujita | H04W 4/008 |
| | | | 455/41.2 |
| 2015/0327304 A1* | 11/2015 | Tinnakornsrisuphap | H04L 41/0809 |
| | | | 709/227 |
| 2017/0033925 A1* | 2/2017 | DeNeut | G06F 21/00 |

* cited by examiner

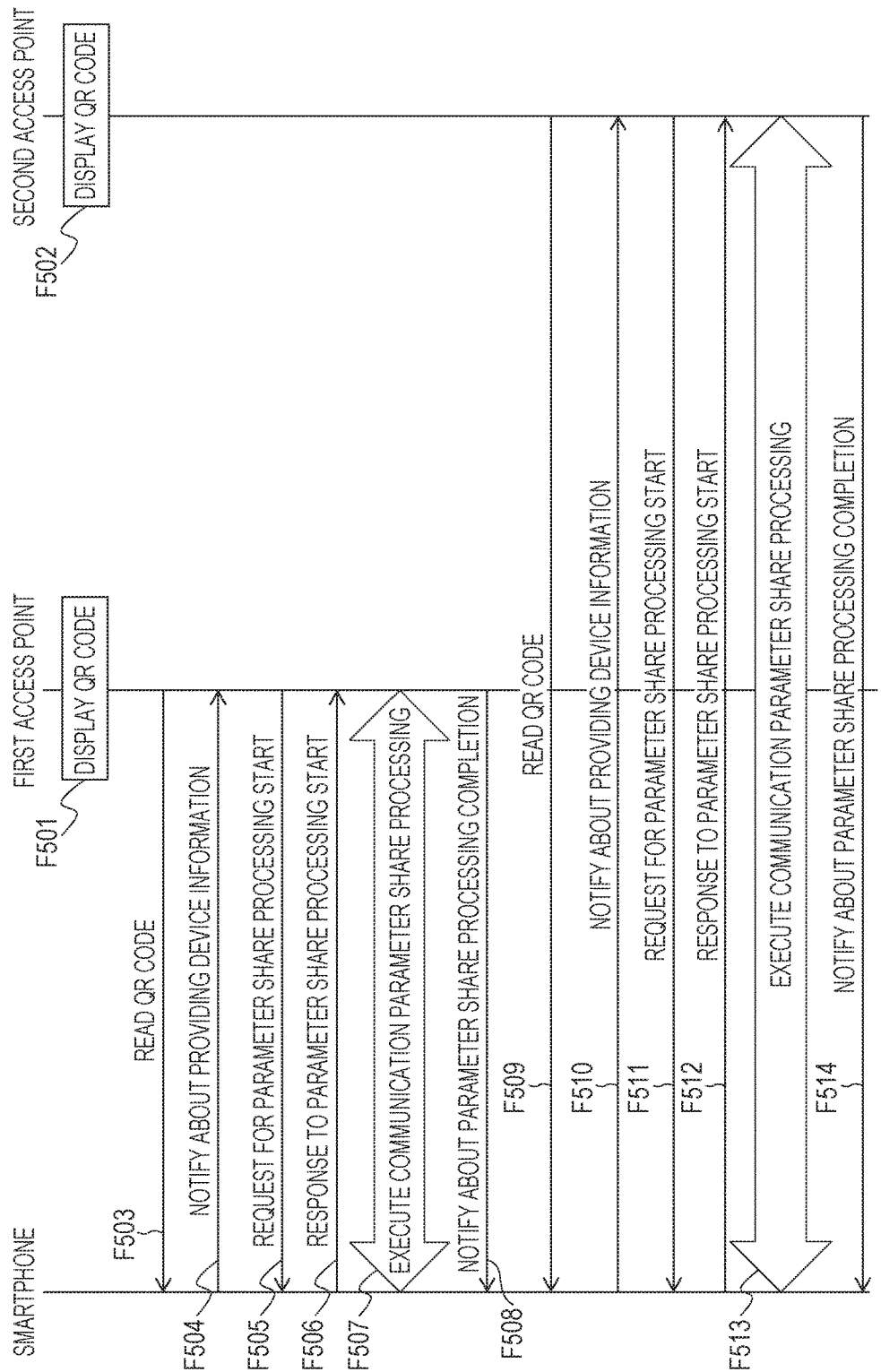

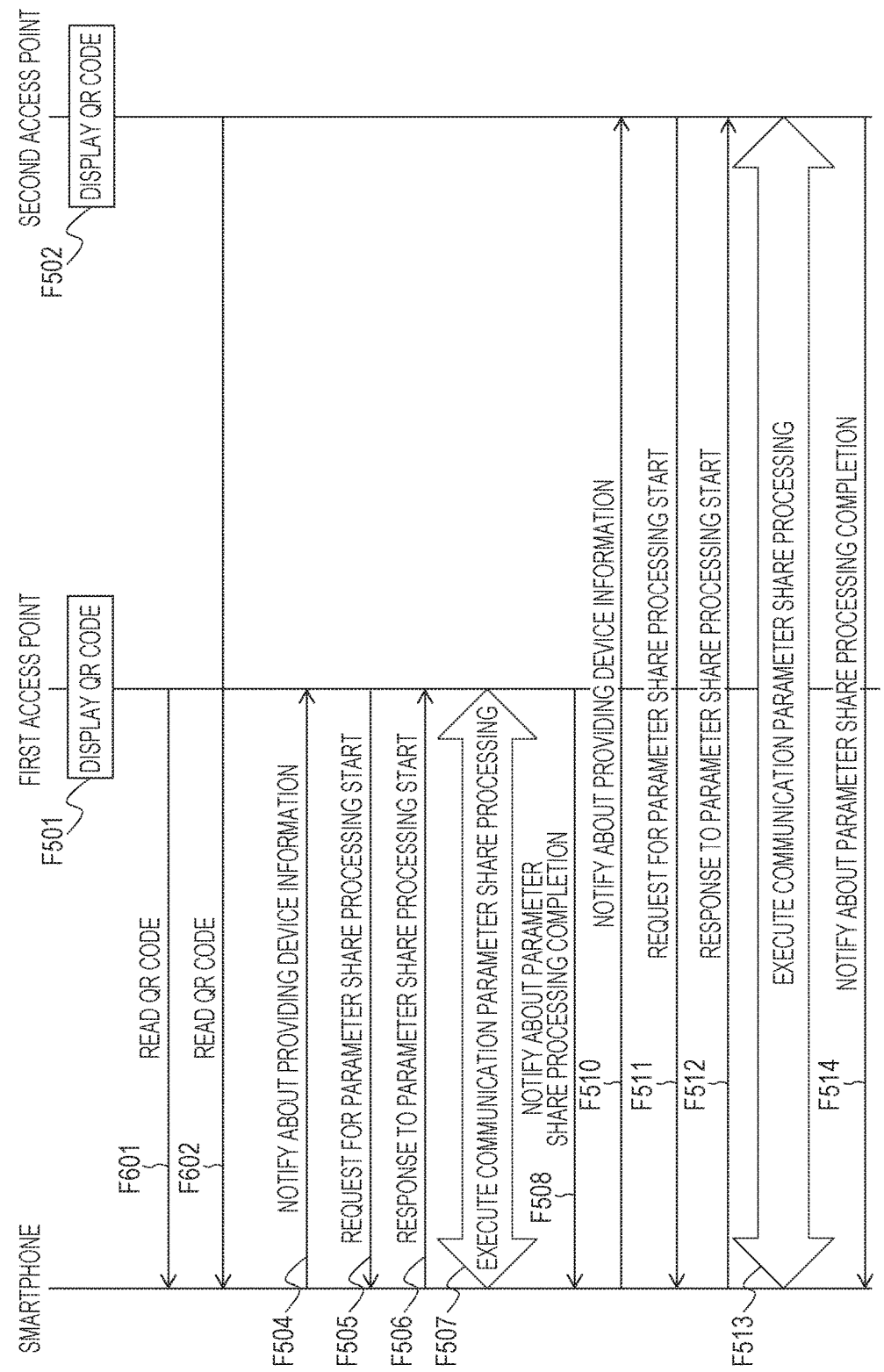

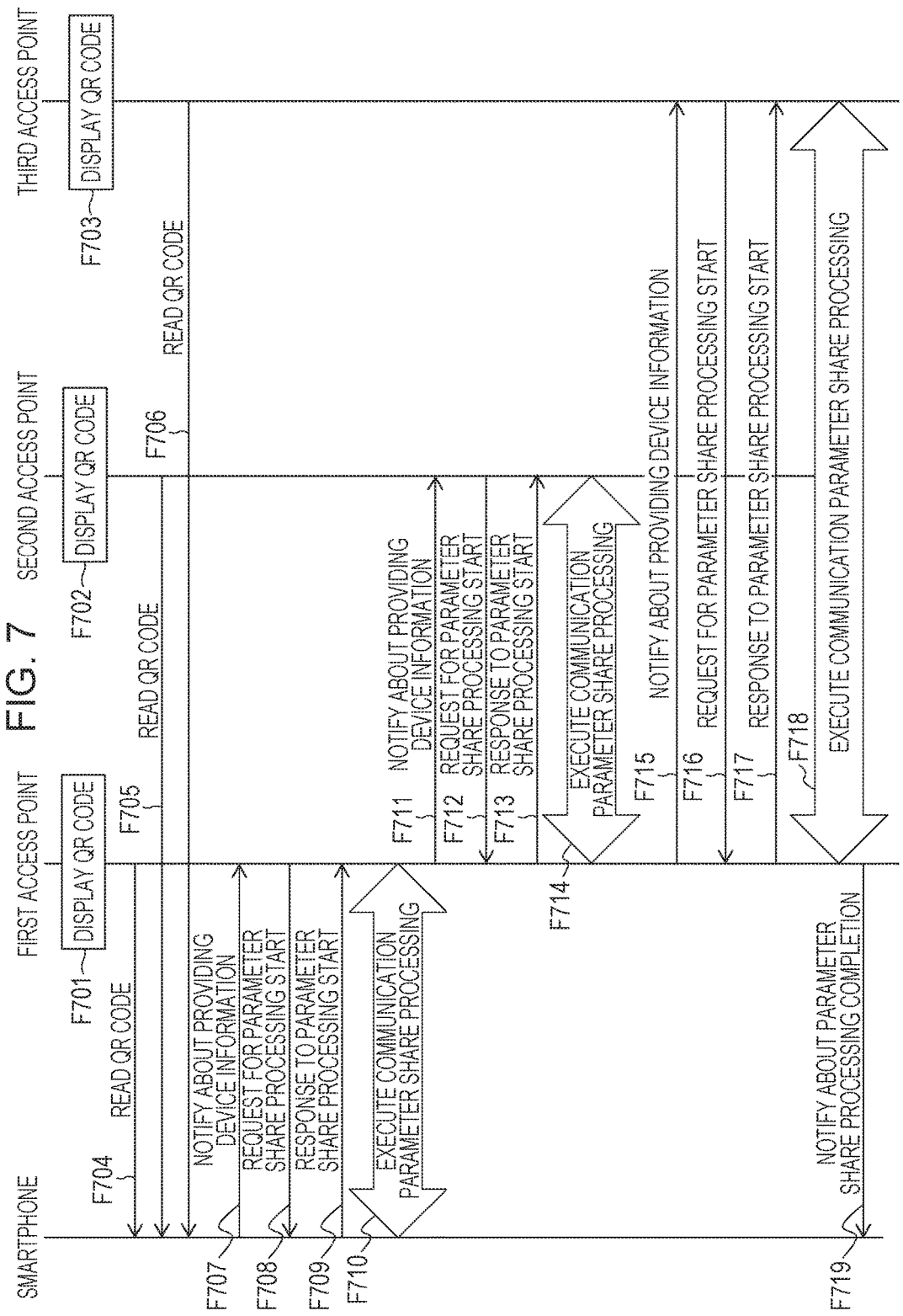

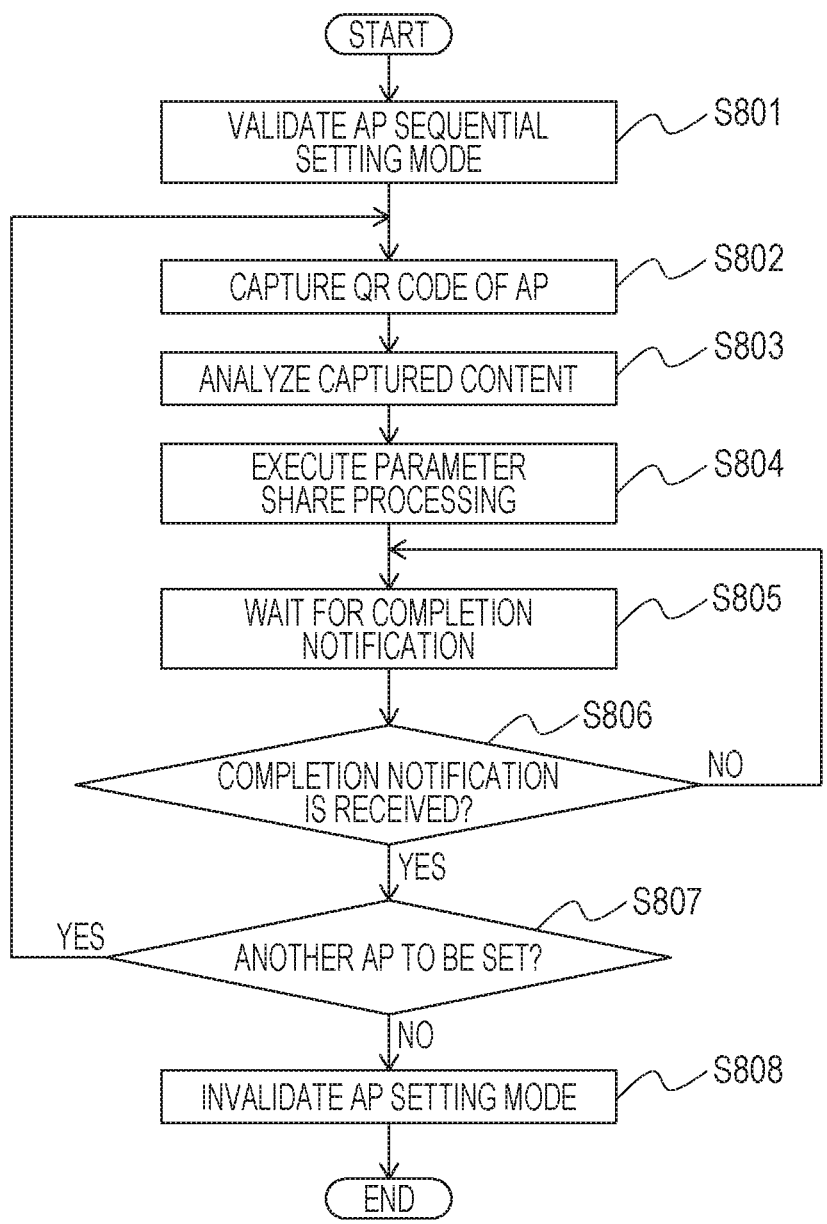

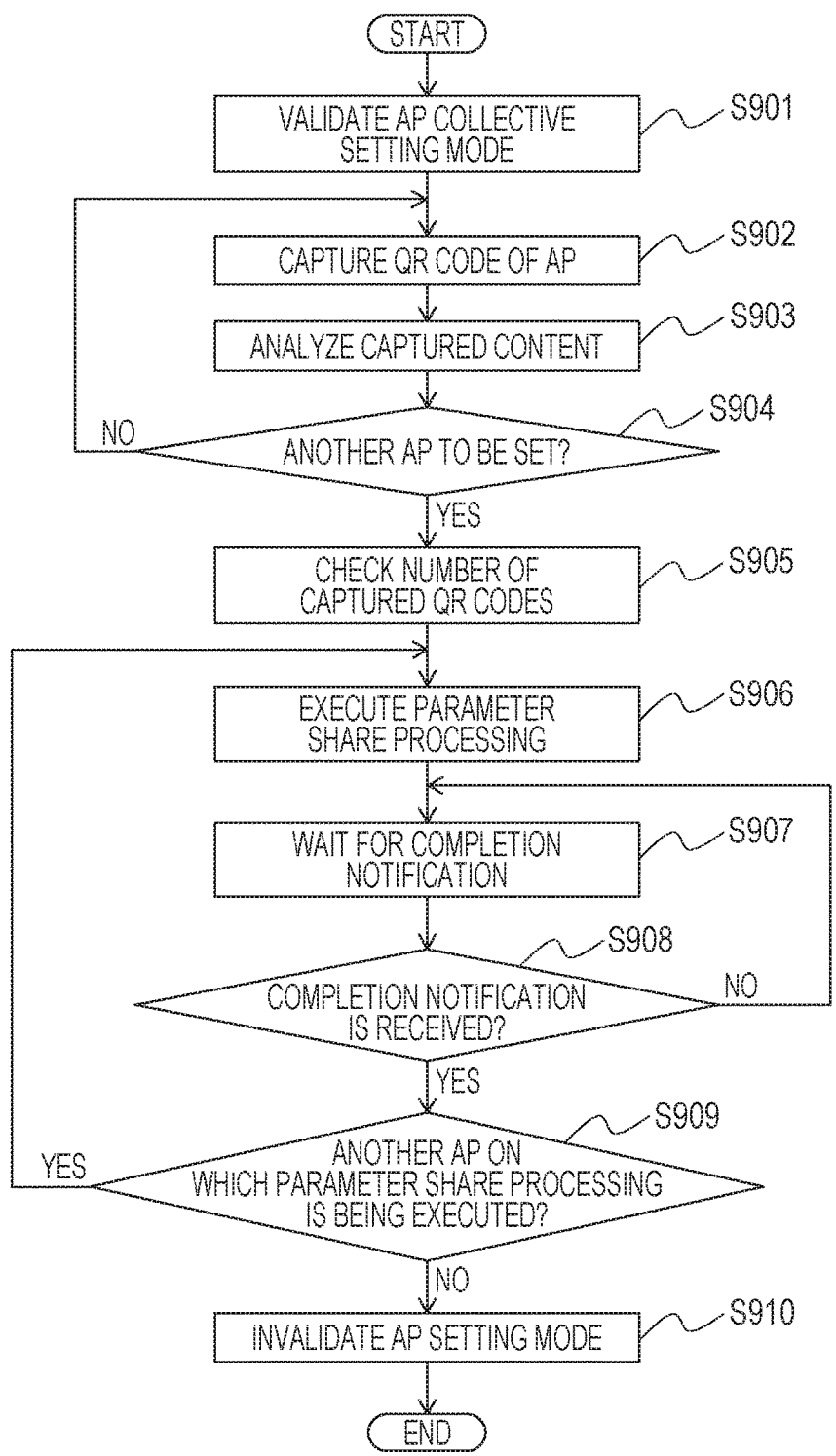

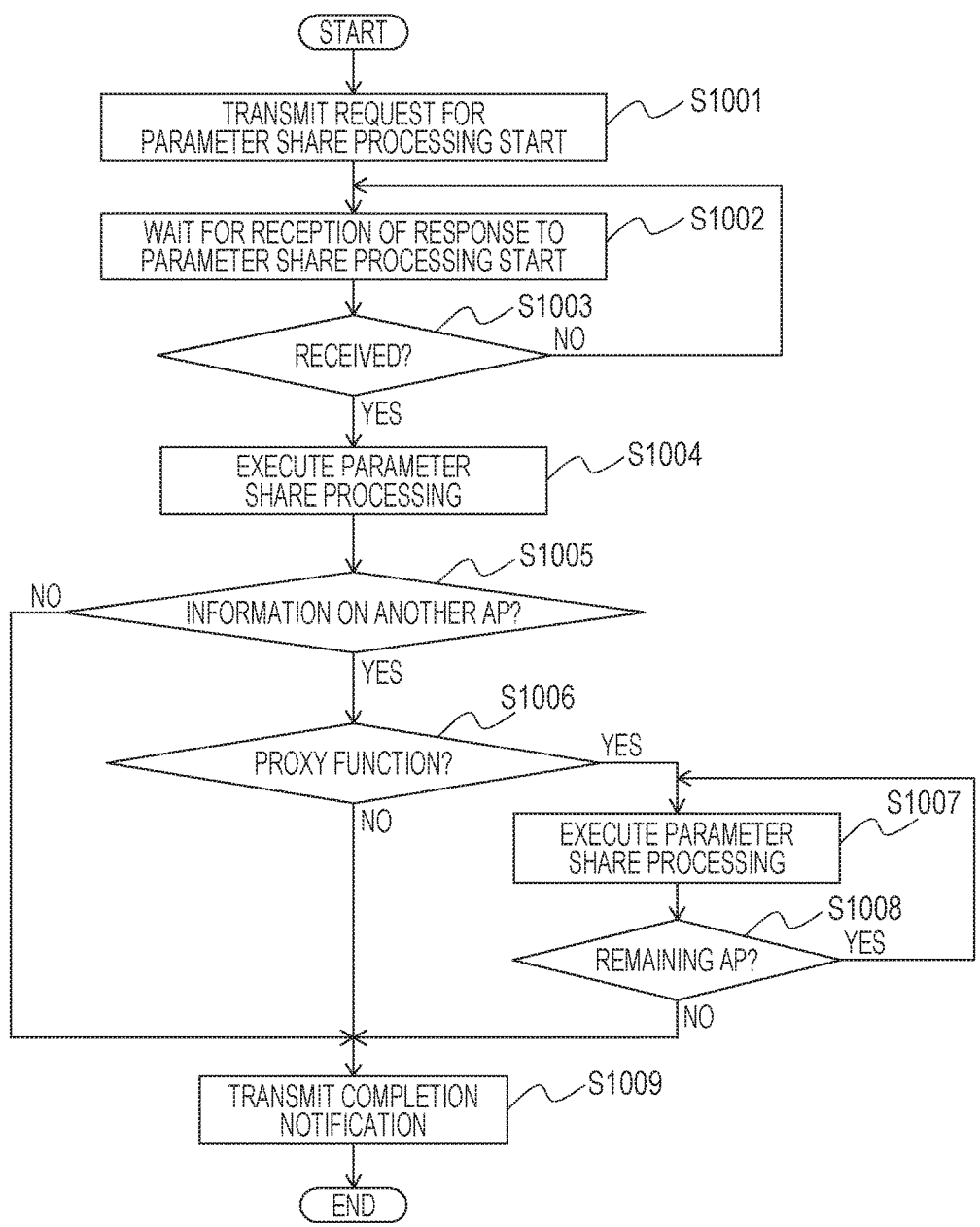

US 10,021,627 B2

COMMUNICATION DEVICE, COMMUNICATION METHOD, AND STORAGE MEDIUM

RELATED APPLICATIONS

This application is a Continuation of U.S. patent application Ser. No. 15/211,950, filed on Jul. 15, 2016, which claims the benefit of Japanese Application No. 2015-144394 filed Jul. 21, 2015, which are hereby incorporated by reference herein in their entirety.

BACKGROUND OF THE INVENTION

Field of the Invention

The present invention relates to a communication technology.

Description of the Related Art

In recent years, in many cases, a wireless communication function is installed in an electronic device, such as a digital camera, a printer, a mobile phone, or a smartphone, and such a device is used in connection with a wireless network.

To connect an electronic device with a wireless network, various parameters are required to be set, such as an encryption scheme, an encryption key, an authentication scheme, and an authentication key. As a technology of easily setting these communication parameters, there is a technology that a mobile terminal reads a QR code (registered trademark, this note may be omitted hereinafter) indicative of a communication parameter displayed by an electronic device, and sets the read communication parameter at an access point (Japanese Patent Laid-Open No. 2014-60623).

With Japanese Patent Laid-Open No. 2014-60623, the communication parameter can be set at the single access point by using the QR code. However, for example, in a network environment in which a plurality of access points are present, such as a network environment of a corporation, it is difficult to set the same communication parameter at the plurality of access points.

The present invention allows a communication parameter to be further easily set at a plurality of access points.

SUMMARY OF THE INVENTION

The present invention provides a communication device including a first acquisition unit configured to acquire information relating to a first access point from a captured first image; a second acquisition unit configured to acquire information relating to a second access point from a captured second image; a start unit configured to start communication parameter share processing of sharing a communication parameter, required for establishing a wireless network, with respect to the first access point or the second access point by using the information acquired by the first acquisition unit or the information acquired by the second acquisition unit; and a reception unit configured to receive a completion notification indicative of completion of the communication parameter share processing with respect to the first access point, from the first access point. The start unit starts the communication parameter share processing with respect to the second access point in response to the reception of the completion notification by the reception unit.

Further features of the present invention will become apparent from the following description of exemplary embodiments with reference to the attached drawings.

BRIEF DESCRIPTION OF THE DRAWINGS

FIG. 5 is an illustration showing an example of a sequence of the communication system according to the first embodiment.

FIG. 6 is an illustration showing an example of a sequence of a communication system according to a second embodiment.

FIG. 7 is an illustration showing an example of a sequence of a communication system according to a third embodiment.

FIG. 8 is a flowchart showing an operation of a smartphone according to the first embodiment.

FIG. 9 is a flowchart showing an operation of a smartphone according to the second embodiment.

FIG. 10 is a flowchart showing an operation of an access point.

DESCRIPTION OF THE EMBODIMENTS

First Embodiment

A communication device according to a first embodiment is described below in detail with reference to the drawings. Described below is an example using a wireless LAN system in conformity with the Institute of Electrical and Electronics Engineers, Inc. (IEEE) 802.11 series. However, the communication form is not necessarily limited to the wireless LAN in conformity with IEEE 802.11.

Figure 3:
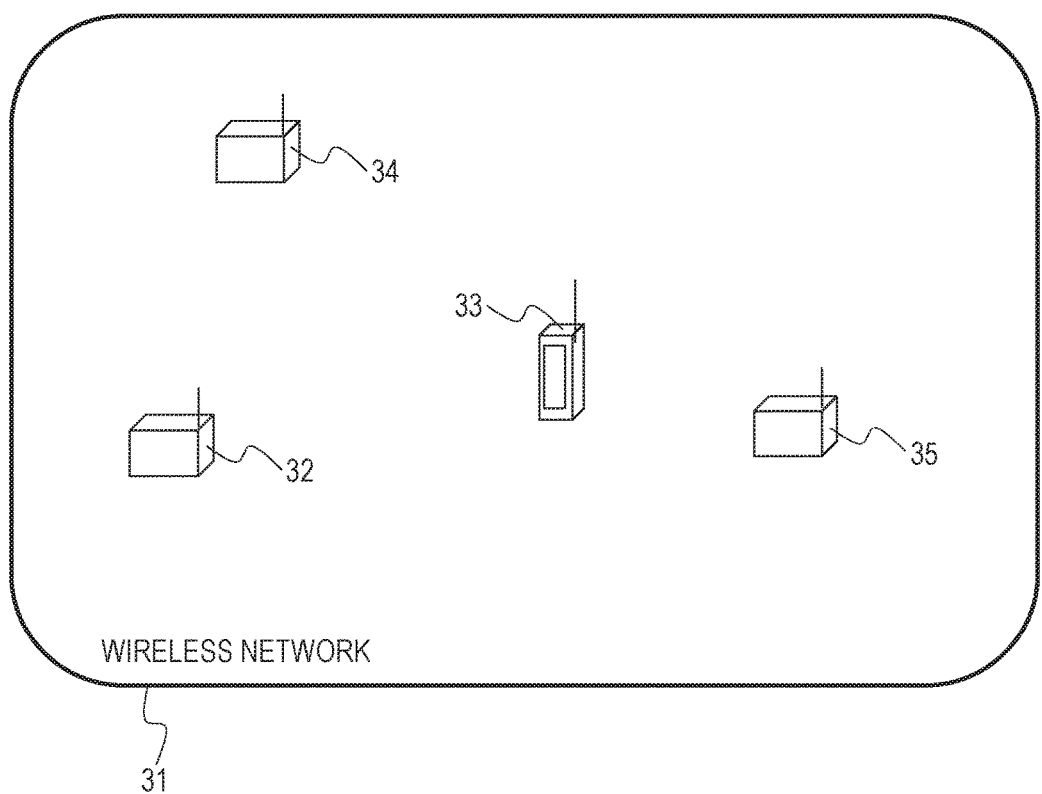
FIG. 3 is an illustration showing an example of a configuration of a communication system.

FIG. 3 illustrates a communication system according to this embodiment. The communication system shown in FIG. 3 includes communication devices, such as a first access point 32 (hereinafter, referred to as first AP), a smartphone 33, a second access point 34 (hereinafter, referred to as second AP), and a third access point 35 (hereinafter, referred to as third AP). A wireless network 31 is an intra-corporate wireless network. Partial wireless LAN settings (service set identifiers (SSIDs), pre-shared keys, etc.) of the first AP, the second AP, and the third AP are the same. The other wireless LAN settings (for example, basic service set identifiers (BSSIDs) and other optional functions) are different among the respective APs. Elements such as wireless LAN communication channels etc. may be the same or different among the respective APs.

In this embodiment, each AP operates as an AP in an infrastructure mode defined by the IEEE 802.11 standard. In this embodiment, each AP is described as an AP dedicated device having only an AP function; however, the AP may be a digital camera or a printer having another function in addition to the AP function.

Figure 1:
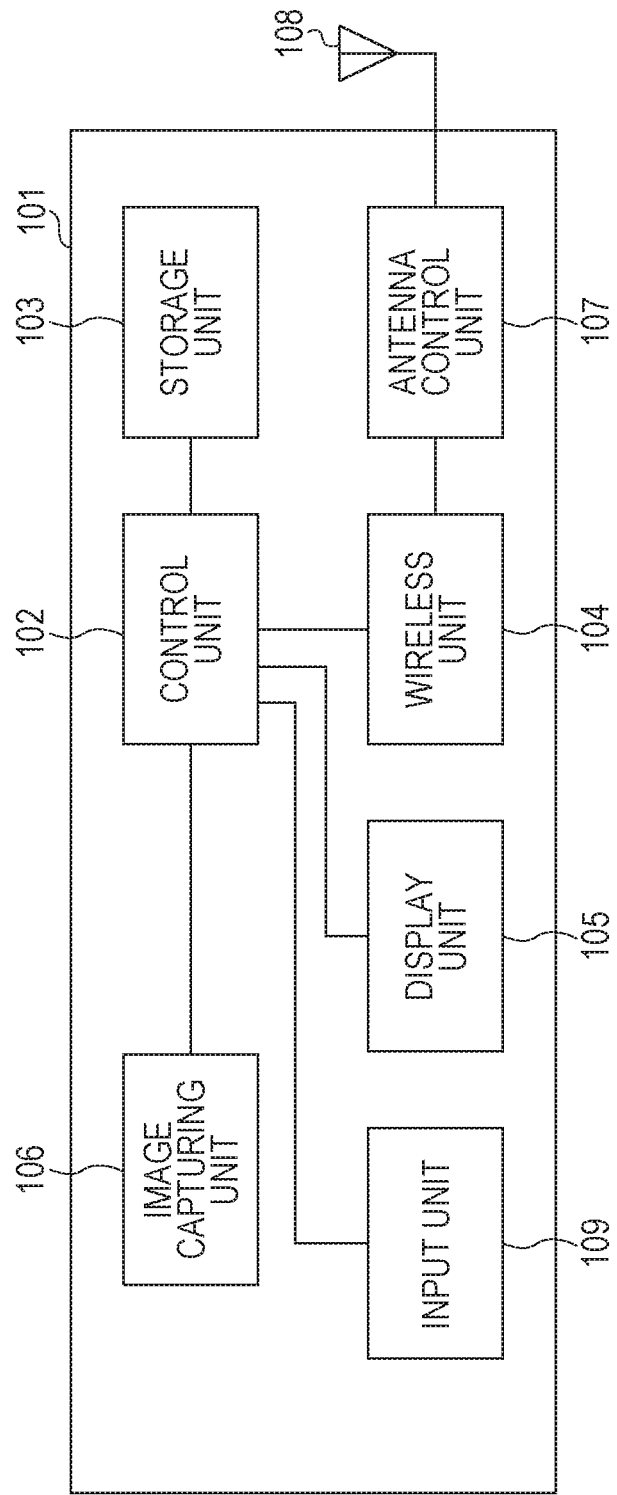
FIG. 1 is an illustration showing a hardware configuration of a communication device.

A hardware configuration according to this embodiment of each communication device in the communication system shown in FIG. 3 is described next with reference to FIG. 1. In FIG. 1, reference sign 101 entirely denotes a communication device. Reference sign 102 denotes a control unit that executes a control program stored in a storage unit 103 and hence controls the entire device. The control unit 102 is configured of, for example, a central processing unit (CPU). Reference sign 103 denotes a storage unit that stores various pieces of information, such as the control program to be executed by the control unit 102, image data, and a communication parameter. Various operations (described later) are performed by the control unit 102 executing the control program stored in the storage unit 103. The storage unit 103 is configured of a storage medium, such as ROM, RAM, HDD, a flash memory, or a removable SD card.

Reference sign 104 denotes a wireless unit for performing wireless LAN communication in conformity with the IEEE 802.11 series. The wireless unit 104 is configured of a chip that performs wireless communication. Reference sign 105 denotes a display unit that performs various displaying, and has a function available for output of visually recognizable information, like LCD or LED, or a function available for sound output like a loudspeaker. The display unit 105 has a function of outputting at least one of visual information and sound information. If the display unit 105 displays visual information, the display unit 105 includes a video RAM (VRAM) that holds image data corresponding to visual information to be displayed. The display unit 105 executes displaying control that causes image data stored in the VRAM to be continuously displayed on the LCD or LED.

Reference sign 106 denotes an image capturing unit that is configured of an image pickup element, a lens, and other members, and performs capturing of a picture or moving images. The image capturing unit 106 captures an image of, for example, a two-dimensional code, such as a barcode or a QR code (registered trademark). Reference sign 107 denotes an antenna control unit that executes output control of an antenna 108. Reference sign 108 is an antenna that can make communication in a 2.4 GHz band and/or a 5 GHz band for wireless LAN communication. Reference sign 109 denotes an input unit. A user makes various inputs and so forth with the input unit 109 for operating the communication device 101. The input unit 109 stores flags corresponding to the inputs in a memory such as the storage unit 103. The configuration shown in FIG. 1 is merely an example, and the communication device may have another hardware configuration. For example, if the communication device is a printer, the communication device may include a print unit in addition to the configuration shown in FIG. 1. If the communication device is an AP dedicated device, the communication device may not include the image capturing unit 106.

Figure 2:
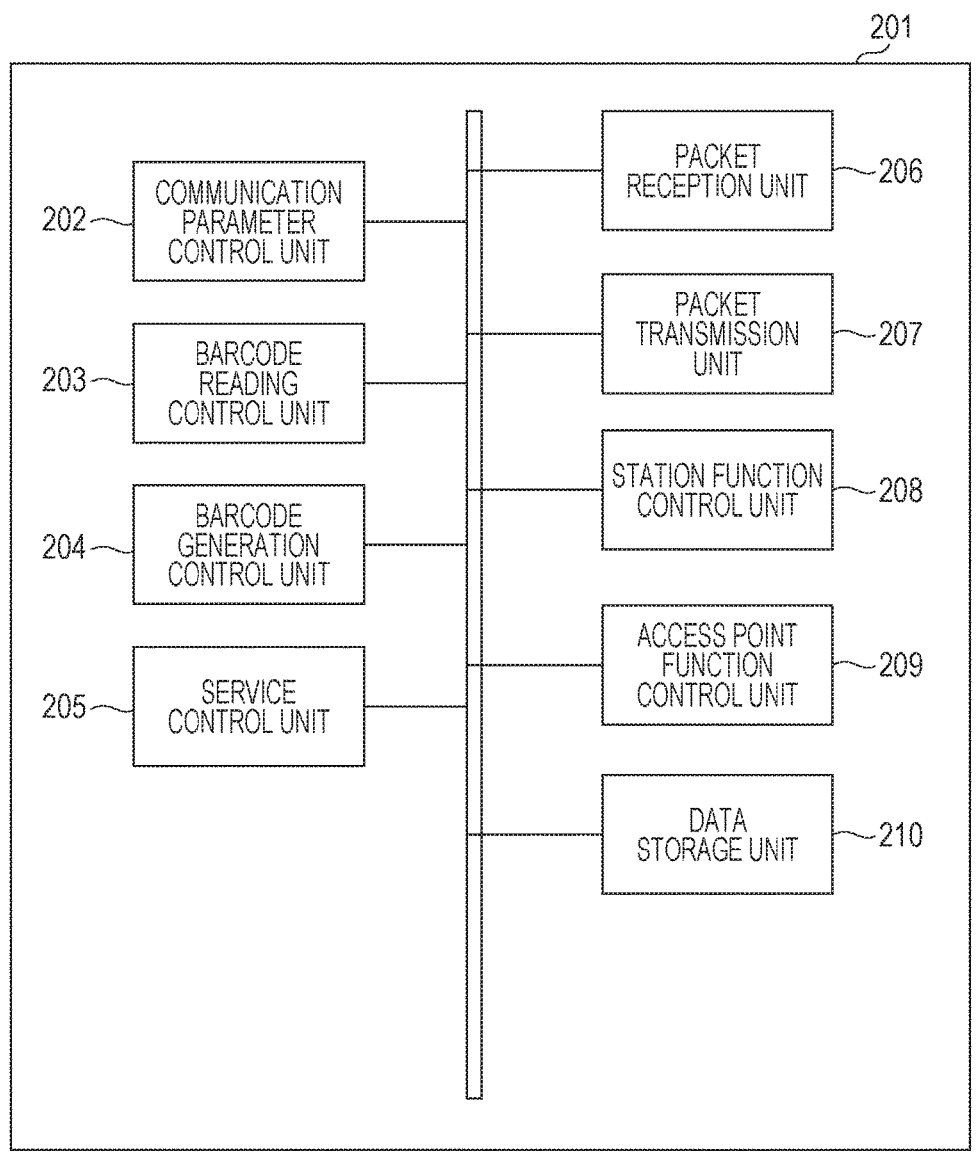
FIG. 2 is an illustration showing a software functional configuration of the communication device.

FIG. 2 is a block diagram showing an example of a configuration of a software functional block that executes a communication control function (described later). In this embodiment, a functional block of each communication device is stored as a program in the corresponding storage unit 103, and the function is provided by the control unit 102 executing the program. The control unit 102 realizes each function by controlling corresponding hardware and by executing calculation and processing on information. The functional block may be partly or entirely configured of hardware. In this case, the portion included in the functional block or the entire functional block is configured of, for example, an application specific integrated circuit (ASIC).

In FIG. 2, reference sign 201 entirely denotes a software functional block. Reference sign 202 denotes a communication parameter control unit. The communication parameter control unit 202 executes communication parameter share processing for allowing devices to share a communication parameter. In the communication parameter share processing, a providing device provides a communication parameter for wireless communication to a reception device. The communication parameter is a wireless communication parameter required for performing wireless LAN communication. To be specific, the communication parameter includes at least any one of SSID serving as a network identifier, an encryption scheme, an encryption key, an authentication scheme, and an authentication key. Also, a media access control (MAC) address, a passphrase, an IP address for performing communication in an IP layer, information required for a higher-order service, etc., may be included. The communication parameter share processing executed by the communication parameter control unit 202 may be Wi-Fi Protected Setup (WPS) or Wi-Fi Direct defined by the Wi-Fi alliance; however, it is not limited thereto.

Reference sign 203 is a barcode reading control unit. The barcode reading control unit 203 analyzes an image of a two-dimensional code, such as a barcode or a QR code, the image of which has been captured by the image capturing unit 106, and acquires coded information.

Reference sign 204 is a barcode generation control unit. The barcode generation control unit 204 executes control for generating, for example, a two-dimensional code, such as a barcode or a QR code, and displaying the two-dimensional code such as the QR code on the display unit 105. Reference sign 205 denotes a service control unit in an application layer. The application layer in this case is a service providing layer in an upper layer in at least five layers in an OSI reference mode. That is, the service control unit 205 executes print processing, image streaming processing, file transfer processing, and so forth, by using the wireless communication provided by the wireless unit 104.

Reference sign 206 denotes a packet reception unit, and 207 denotes a packet transmission unit. These units control transmission and reception for all packets including an upper-layer communication protocol. Also, the packet reception unit 206 and the packet transmission unit 207 control the wireless unit 104 for transmission and reception of a packet in conformity with the IEEE 802.11 standard with respect to a target device.

Reference sign 208 is a station function control unit that provides a STA function operating as a station (STA) in the infrastructure mode defined in the IEEE 802.11 standard. The STA function control unit 208 executes, for example, authentication and encryption processing when operating as STA. Reference sign 209 is an access point function control unit that provides an AP function operating as an access point (AP) in the infrastructure mode defined in the IEEE 802.11 standard. The AP function control unit 209 forms a wireless network, and executes authentication and encryption processing for STA, management of STA, etc. Reference sign 210 is a data storage unit that controls software itself, and writing and reading out of, for example, a communication parameter and information on a barcode etc. in and from the storage unit 103.

The above-described functional block is merely an example. A plurality of functional blocks may configure a single functional block, or any one of functional blocks may be divided into a plurality of functional blocks. Similarly to the description in FIG. 1, if the communication device is an AP dedicated device, the communication device may not include the barcode reading control unit 203.

Figure 4:
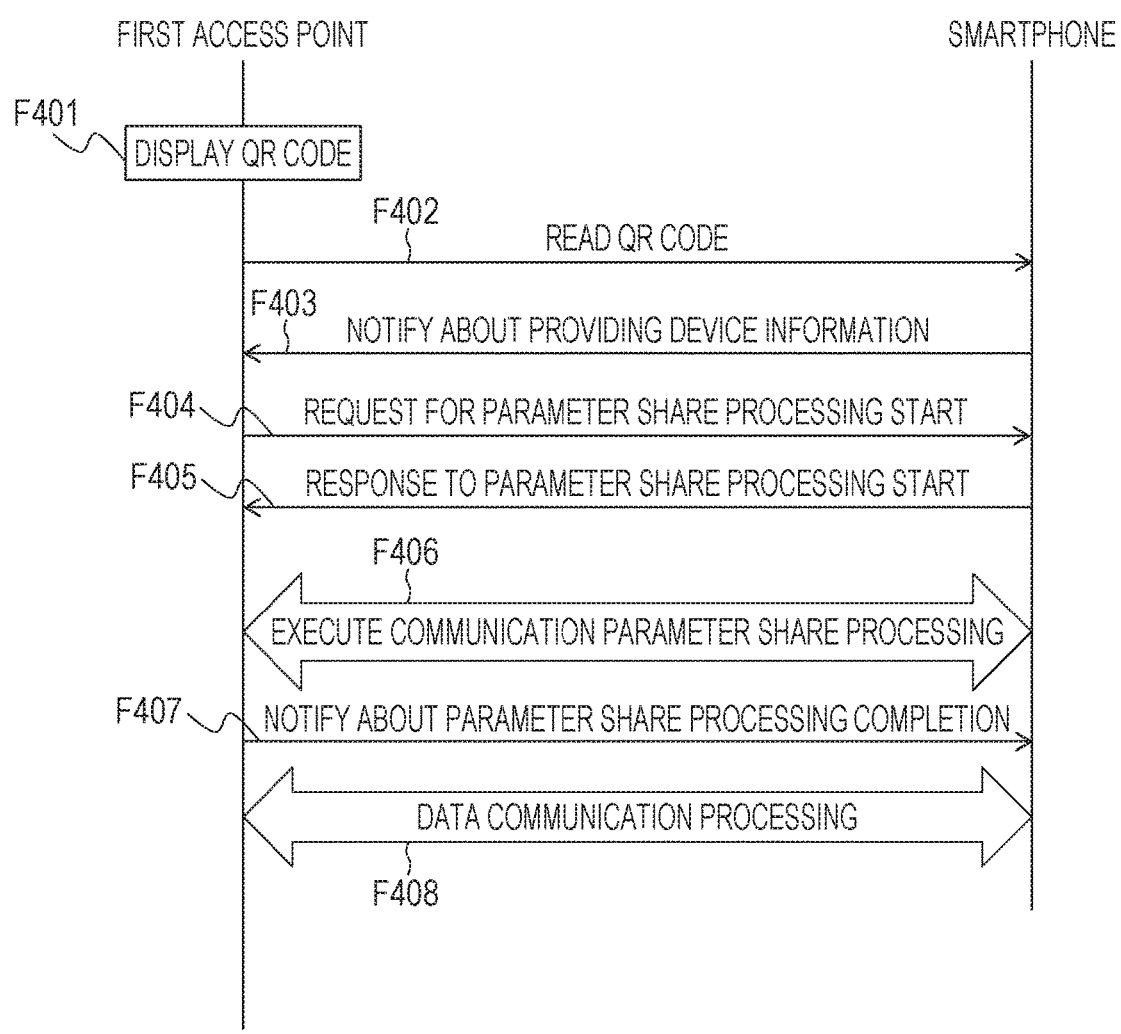
FIG. 4 is an illustration showing an example of a sequence of a communication system according to a first embodiment.

An operation of the communication system having the above-described configuration is described. FIG. 4 illustrates a connection sequence in communication setting between respective communication devices including the first AP 32 and the smartphone 33. Described in this example is a case of setting a wireless LAN parameter from the smartphone 33 to cause the first AP 32 to establish the wireless network 31. In FIG. 4, the smartphone 33 transmits the wireless LAN parameter required for forming the wireless network 31 to the first AP 32.

The first AP 32 causes its own display unit 105 to display a QR code having information required for setting a communication parameter in accordance with a user operation (F401). The smartphone 33 reads the QR code displayed on the first AP 32, by the image capturing unit 106 of the smartphone 33 (F402). The smartphone 33 decodes the read QR code, and acquires information indicated by the QR code. The smartphone 33 judges whether or not the information acquired from the QR code is information required for setting the communication parameter.

In this case, the information required for setting the communication parameter is, for example, information used for encryption when the communication parameter is transmitted or received, and identification information on (of) the device that sets the communication parameter. The information used for encryption when the communication parameter is transmitted or received may be a public key or a certificate. The method of encrypting the communication parameter by using the public key in the parameter share processing may use, for example, a technology described in Japanese Patent Laid-Open No. 2013-17237. The identification information on (of) the device may be a MAC address or a universal unique identifier (UUID) that uniquely identifies a device. Also, the information required for setting the communication parameter may be an identifier indicative of the communication parameter share processing. Also, identification information of, for example, a one-time password scheme using a QR code may be included.

If the information acquired from the QR code is the information required for setting the communication parameter, the smartphone 33 notifies the first AP 32 about the information included in the QR code (F403). In this case, the information to be transmitted may be all information included in the QR code, or part of the information. Further, information to which information specific to the smartphone 33 is added may be notified.

The first AP 32 transmits a parameter share processing start request signal to the smartphone 33 on the basis of the identification information on the first AP 32 acquired in F403 from the smartphone 33 (F404). The smartphone 33, which has received the parameter share processing start request signal, returns a parameter share processing start response to the first AP 32 if the communication parameter share processing can be executed (F405).

Then, the communication parameter share processing is executed between the smartphone 33 and the first AP 32 (F406). The communication parameter share processing in F406 may be in conformity with a standardized scheme, such as the aforementioned WPS, or may be parameter share processing which is not a standardized scheme but is specific to the corporation. In this embodiment, the communication parameter is provided from the smartphone 33 to the first AP 32. At a time point when the share processing executed in F406 is completed, the first AP 32 transmits a parameter share processing completion notification indicative of the completion of the communication parameter share processing to the smartphone 33 (F407). After the parameter share processing is completed, data communication is executed (F408).

In the operation sequence in FIG. 4, a case has been described, in which the wireless LAN access point to newly participate for establishing the wireless network is only the single first AP 32. Described next is an example in which the AP to newly participate includes a plurality of APs of the first AP 32 and the second AP 34, with reference to FIG. 5.

FIG. 5 illustrates a connection sequence in communication setting among respective communication devices including the first AP 32, the smartphone 33, and the second AP 34.

The first AP 32 and the second AP 34 cause their own display units 105 to display QR codes having information required for setting a communication parameter in accordance with user operations. It is to be noted that the first AP 32 displays the QR code having the information required for setting the communication parameter if the communication parameter setting mode is instructed by the user (F501). Similarly, the second AP 34 also displays the QR code having the information required for setting the communication parameter if the communication parameter setting mode is instructed by the user (F502).

In the first embodiment, the communication parameter setting processing is executed for the first AP 32 and the second AP 34 sequentially one by one. That is, the image of the QR code of one AP is captured and the communication parameter setting is completed, and then, the image of the QR code of another AP is captured and the communication parameter setting is executed.

The smartphone 33 first reads the QR code displayed on the first AP 32, by the image capturing unit 106 of the smartphone 33 (F503). The smartphone 33 decodes the read QR code, and acquires information indicated by the QR code. The smartphone 33 judges whether or not the information acquired form the QR code is information required for setting the communication parameter. If the content of the QR code is the information required for setting the communication parameter, the smartphone 33 notifies the first AP 32 about identification information on the smartphone 33 expected to provide the communication parameter (F504).

The first AP 32 transmits the parameter share processing start request signal to the smartphone 33 on the basis of the identification information acquired in F504 from the smartphone 33 (F505). The smartphone 33, which has received the parameter share processing start request signal, returns the parameter share processing start response to the first AP 32 if the communication parameter share processing can be executed (F506).

Then, the communication parameter share processing is executed between the first AP 32 and the smartphone 33 (F507). At a time point when the share processing executed in F507 is completed, the first AP 32 transmits the parameter share processing completion notification indicative of the completion of the communication parameter share processing to the smartphone 33 (F508).

With the above-described processing, the information on the wireless network 31 is set at the first AP 32. Then, to connect the second AP 34 with the wireless network 31, the smartphone 33 reads out the QR code displayed on the second AP 34, by the image capturing unit 106 of the smartphone 33 (F509). The smartphone 33 decodes the read QR code, and acquires information indicated by the QR code. The smartphone 33 judges whether or not the information acquired form the QR code is information required for setting the communication parameter.

If the content of the QR code is the information required for setting the communication parameter, the smartphone 33 notifies the second AP 34 about identification information on the smartphone 33 expected to provide the communication parameter (F510).

The second AP 34 transmits the parameter share processing start request signal to the smartphone 33 on the basis of the information on the smartphone 33 acquired in F510 from the smartphone 33 (F511). The smartphone 33, which has received the parameter share processing start request signal, returns the parameter share processing start response to the second AP 34 if the communication parameter share processing can be executed (F512).

Then, the communication parameter share processing is executed between the second AP 34 and the smartphone 33 (F513). At a time point when the share processing executed in F513 is completed, the second AP 34 transmits the parameter share processing completion notification indicative of the completion of the communication parameter share processing to the smartphone 33 (F514).

With the above-described connection sequence, the first AP 32 and the second AP 34 can establish the wireless network 31.

Next, a processing flow executed by the smartphone 33 in FIGS. 4 and 5 is described with reference to FIG. 8. FIG. 8 is a flowchart describing an operation flow that is executed by the smartphone 33. Respective steps in the flowchart are processed by the control unit 102 executing the control program stored in the storage unit 103.

The smartphone 33 activates a communication parameter setting application by an operation by the user with the input unit 109, and validates an access point sequential setting mode (S801).

The smartphone 33 captures an image of a desirable QR code after activating the communication parameter setting application. That is, in this embodiment, the smartphone 33 captures an image of the QR code of the first AP 32 or the second AP 34 (S802). Then, the smartphone 33 analyzes the captured QR code (S803). If information acquired by analyzing the QR code is information required for setting the communication parameter, the smartphone 33 executes the parameter share processing with respect to one AP (32 or 34) (S804). Then, the smartphone 33 waits for the parameter share processing completion notification indicative of whether or not the share processing has been completed (S805). The smartphone 33 further judges whether or not the smartphone 33 has received the parameter share processing completion notification (S806), and if the smartphone 33 has not received, the smartphone 33 repeats step S805 for a predetermined period of time. In contrast, if the smartphone 33 has received the parameter share processing completion notification in step S806, the smartphone 33 causes the user to select whether another AP for the parameter share processing is present or not (S807).

As the selection result, if there is another AP required for setting the communication parameter, the smartphone 33 repeats processing from step S802, and executes the parameter share processing with respect to the AP whose communication parameter is not set yet (AP not being the one AP). The processing from step S802 to step S807 is repeated similarly for third and later APs if there are APs whose communication parameter is to be set. In contrast, if setting is not required any more in step S807, the access point sequential setting mode, which has been validated in step S801, is invalidated (S808).

In the above-described first embodiment, by a simple operation such that the smartphone captures the image of the QR code displayed on the AP, the wireless parameter can be newly provided to the AP. Accordingly, since a desirable wireless network can be established for an AP by a simple operation, usability of system integrator increases. In particular, even when a wireless network established by a plurality of APs is newly established, images of QR codes respectively displayed on the plurality of APs may be sequentially captured with the smartphone. The usability of the system integrator is further increased.

In the first embodiment, to set the communication parameter reliably at the plurality of APs, a limitation may be added such that an image of a QR code cannot be further captured unless the smartphone 33 receives the parameter share processing completion notification (F508). In this case, when the mode of capturing an image of a QR code is instructed by the user, the smartphone 33 determines whether or not the smartphone 33 has received the parameter share processing completion notification, and executes control not to activate the mode of capturing a QR code in accordance with the determination result. Accordingly, the parameter share processing can be prevented from being started simultaneously with a plurality of communication devices, and hence the processing load can be decreased.

Second Embodiment

In the first embodiment, the example has been described in which the smartphone captures the image of the QR code of the second AP after the smartphone completes the setting of the communication parameter of the first AP. In contrast, in the second embodiment, an example is described in which the smartphone captures QR codes of a plurality of APs in advance. The configuration of the communication system and the configuration of each communication device are similar to those in FIGS. 1 to 3, and hence the redundant description is omitted.

Described below is an example in which the AP that newly establishes the wireless network 31 includes a plurality of APs of the first AP 32 and the second AP 34, with reference to FIG. 6. Also this embodiment can be applied to, not only the case in which a communication parameter is set at two APs, but also the case in which a communication parameter is set at three or more APs.

FIG. 6 illustrates a connection sequence in communication setting among respective communication devices including the first AP 32, the smartphone 33, and the second AP 34.

The first AP 32 and the second AP 34 cause their own display units 105 to display QR codes having information required for setting a communication parameter in accordance with user operations. It is to be noted that the first AP 32 displays the QR code having the information required for setting the communication parameter if the communication parameter setting mode is instructed by the user (F501). Similarly, the second AP 34 also displays the QR code having the information required for setting the communication parameter if the communication parameter setting mode is instructed by the user (F502).

In the second embodiment, the images of the QR codes of the first AP 32 and the second AP 34 are collectively captured, and then the communication parameter setting processing is executed on the first AP 32 and the second AP 34 one by one. That is, images of all QR codes for a plurality of APs being subjects of the communication parameter setting are captured, and then, the communication parameter setting is executed on each of the APs.

The smartphone 33 first reads the QR code displayed on the first AP 32, by the image capturing unit 106 of the smartphone 33 (F601). The smartphone 33 decodes the read QR code, and acquires information indicated by the QR code. The smartphone 33 judges whether or not the information acquired form the QR code is information required for setting the communication parameter.

Then, the smartphone 33 reads the QR code displayed on the second AP 34, by the image capturing unit 106 of the smartphone 33 (F602). The smartphone 33 decodes the read QR code, and acquires information indicated by the QR code. The smartphone 33 judges whether or not the information acquired form the QR code is information required for setting the communication parameter.

If the content of the QR code read from the first AP 32 is the information required for setting the communication parameter, the smartphone 33 notifies the first AP 32 about identification information on the smartphone 33 expected to provide the communication parameter (F504).

The first AP 32 transmits the parameter share processing start request signal to the smartphone 33 on the basis of the identification information acquired in F504 from the smartphone 33 (F505). The smartphone 33, which has received the parameter share processing start request signal, returns the parameter share processing start response to the first AP 32 if the communication parameter share processing can be executed (F506).

Then, the communication parameter share processing is executed between the first AP 32 and the smartphone 33 (F507). At a time point when the share processing executed in F507 is completed, the first AP 32 transmits the parameter share processing completion notification indicative of the completion of the communication parameter share processing to the smartphone 33 (F508).

With the above-described processing, the information on the wireless network 31 is set at the first AP 32. Subsequently, the processing is executed with respect to the second AP 34. If the content of the QR code read from the second AP 34 is the information required for setting the communication parameter, the smartphone 33 notifies the second AP 34 about identification information on the smartphone 33 expected to provide the communication parameter (F510).

The second AP 34 transmits the parameter share processing start request signal to the smartphone 33 on the basis of the information on the smartphone 33 acquired in F510 from the smartphone 33 (F511). The smartphone 33, which has received the parameter share processing start request signal, returns the parameter share processing start response to the second AP 34 if the communication parameter share processing can be executed (F512).

Then, the communication parameter share processing is executed between the second AP 34 and the smartphone 33 (F513). At a time point when the share processing executed in F513 is completed, the second AP 34 transmits the parameter share processing completion notification indicative of the completion of the communication parameter share processing to the smartphone 33 (F514).

With the above-described connection sequence, the first AP 32 and the second AP 34 can establish the wireless network 31.

Next, a processing flow executed by the smartphone 33 in FIG. 6 is described with reference to FIG. 9. FIG. 9 is a flowchart describing an operation flow that is executed by the smartphone 33. Respective steps in the flowchart are processed by the control unit 102 executing the control program stored in the storage unit 103.

The smartphone 33 activates a communication parameter setting application by an operation by the user with the input unit 109, and validates an access point collective setting mode (S901).

Then the smartphone 33 captures an image of the QR code of the first AP 32 or the second AP 34 after activating the communication parameter setting application (S902). Then, the smartphone 33 analyzes the captured QR code (S903). If information acquired by analyzing the QR code is information required for setting the communication parameter, the information is stored. The smartphone 33 causes the user to select whether another AP for the parameter share processing is present or not (S904). As the selection result, if there is another AP required for setting the communication parameter, the processing from step S902 is repeated.

In contrast, in step S904, if setting is no longer required, the smartphone 33 checks the number of captured QR codes, that is, the number of APs required for setting the communication parameter (S905).

The smartphone 33 executes the parameter share processing with respect to a desirable AP from the acquired information (S906). Then, the smartphone 33 waits for the parameter share processing completion notification indicative of the completion of the parameter share processing (S907). The smartphone 33 judges whether or not the smartphone 33 has received the parameter share processing completion notification (S908), and if the smartphone 33 has not received, the smartphone 33 repeats step S907 for a predetermined period of time. In contrast, if the smartphone 33 has received the parameter share processing completion notification in step S908, the smartphone 33 judges whether another AP, with which the parameter share processing is being executed, is present or not (S909). To be specific, the judgment is made by comparison between the number information stored in step S905 and the number of APs that have transmitted the parameter share processing completion notification (S909).

As the judgment result, if there is another AP required for setting the communication parameter, the processing from step S906 is repeated. In contrast, if setting is not required any more in step S909, the access point collective setting mode, which has been validated in step S901, is invalidated (S910).

As described above, in the second embodiment, reading out second and later QR codes can be started without waiting for the end of the communication parameter share processing based on the first read QR code. Accordingly, the usability of the user is further increased, in addition to the advantageous effects acquired by the first embodiment.

Third Embodiment

In the first and second embodiments, the example has been described in which the smartphone executes communication parameter setting on a plurality of APs. In the third embodiment, an example is described in which, after the smartphone completes the communication parameter setting on the first AP, the first AP executes the communication parameter setting on the residual second AP and third AP instead of the smartphone. The configuration of the communication system and the configuration of each communication device are similar to those in FIGS. 1 to 3, and hence the redundant description is omitted.

FIG. 7 illustrates a connection sequence in communication setting among respective communication devices including the first AP 32, the smartphone 33, the second AP 34, and the third AP 35.

The first AP 32, the second AP 34, and the third AP 35 cause their own display units 105 to display QR codes having information required for setting the communication parameter in accordance with user operations. It is to be noted that the first AP 32 displays the QR code having the information required for setting the communication parameter if the communication parameter setting mode is instructed by the user (F701). Similarly, the second AP 34 and the third AP 35 also display the QR codes having the information required for setting the communication parameter if the communication parameter setting mode is instructed by the user (F702, F703).

In the third embodiment, the images of the QR codes of the first AP 32, the second AP 34, and the third AP 35 are collectively captured, and then the smartphone 33 executes the communication parameter setting processing with desirable one of the APs. The communication parameter setting processing with respect to the other residual APs is executed between the smartphone 33 and the specific one AP which has executed the setting processing. That is, after all the QR codes of the plurality of APs being the subjects of the communication parameter setting are captured, the specific one AP executes the communication parameter setting processing as a proxy device of the smartphone 33.

The smartphone 33 first reads the QR code displayed on the first AP 32, by the image capturing unit 106 of the smartphone 33 (F704). The smartphone 33 decodes the read QR code, and acquires information indicated by the QR code. The smartphone 33 judges whether or not the information acquired form the QR code is information required for setting the communication parameter.

Then, the smartphone 33 reads the QR code displayed on the second AP 34, by the image capturing unit 106 of the smartphone 33 (F705). The smartphone 33 decodes the read QR code, and acquires information indicated by the QR code. The smartphone 33 judges whether or not the information acquired form the QR code is information required for setting the communication parameter.

Then, the smartphone 33 reads the QR code displayed on the third AP 35, by the image capturing unit 106 of the smartphone 33 (F706). The smartphone 33 decodes the read QR code, and acquires information indicated by the QR code. The smartphone 33 judges whether or not the information acquired form the QR code is information required for setting the communication parameter.

If the content of the QR code read from the first AP 32 is the information required for setting the communication parameter, the smartphone 33 notifies the first AP 32 about identification information on the smartphone 33 expected to provide the communication parameter (F707).

The first AP 32 transmits the parameter share processing start request signal to the smartphone 33 on the basis of the identification information acquired in F707 from the smartphone 33 (F708). The smartphone 33, which has received the parameter share processing start request signal, returns the parameter share processing start response to the first AP 32 if the communication parameter share processing can be executed (F709). Then, the communication parameter share processing is executed between the first AP 32 and the smartphone 33 (F710).

In this embodiment, the smartphone 33 notifies the first AP 32 also about the information on the second AP 34 and the information on the third AP 35 acquired in F705 and F706 in the communication parameter share processing executed with respect to the first AP 32. Then, the first AP 32 which has received these pieces of information judges whether or not the first AP 32 has a function of providing the communication parameter acquired from the smartphone 33 to the other APs (hereinafter, referred to as proxy function). If the first AP 32 has the proxy function, the first AP 32 notifies the smartphone 33 about that the first AP 32 has the proxy function.

Then, the first AP 32 notifies the second AP 34 about identification information on the first AP 32 expected to provide the communication parameter, on the basis of the information on the second AP 34 received from the smartphone 33 (F711).

The second AP 34 transmits the parameter share processing start request signal to the first AP 32 on the basis of the identification information acquired in F711 from the first AP 32 (F712). The first AP 32, which has received the parameter share processing start request signal, returns the parameter share processing start response to the second AP 34 if the communication parameter share processing can be executed (F713). Then, the communication parameter share processing is executed between the first AP 32 and the second AP 34 (F714).

Subsequently, the first AP 32 makes communication with the third AP 35. The first AP 32 notifies the third AP 35 about the identification information on the first AP 32 expected to provide the communication parameter, on the basis of the information on the third AP 35 received from the smartphone 33 (F715).

The third AP 35 transmits the parameter share processing start request signal to the first AP 32 on the basis of the identification information acquired in F715 from the first AP 32 (F716). The first AP 32, which has received the parameter share processing start request signal, returns the parameter share processing start response to the third AP 35 if the communication parameter share processing can be executed (F717). Then, the communication parameter share processing is executed between the first AP 32 and the third AP 35 (F718).

The first AP 32 which has completed the communication parameter share processing with respect to the second AP 34 and the third AP 35 transmits the parameter share processing completion notification to the smartphone 33 (F719). In this case, the completion notification to be transmitted may include information indicative of the completion of the parameter share processing with respect to the second AP 34 and the third AP 35.

Next, a processing flow executed by each AP in FIG. 7 is described with reference to FIG. 10. Respective steps in the flowchart in FIG. 10 are processed by the control unit 102 executing the control program stored in the storage unit 103. Also, this flowchart is started when an AP receives providing device information transmitted from another device.

First, an AP (for example, first AP 32) transmits the parameter share processing start request to a target device being a transmission source of the providing device information (S1001).

Then, the AP waits for parameter share processing start response from the target device (S1002). If the AP receives the parameter share processing start response (YES in S1003), the AP executes the parameter share processing with the target device being the transmission source of the parameter share processing start response (S1004). If the AP does not receive the parameter share processing start response for a predetermined period of time (NO in S1004), the flow may be ended in error.

When the parameter share processing with the target device is ended in S1004, the first AP 32 judges whether or not the first AP 32 is notified about identification information on another AP from the target device in the parameter share processing (S1005). If the information on the other AP is notified (YES in S1005), the first AP 32 judges whether or not the first AP 32 has the proxy function (S1006). In contrast, if it is judged that the information on the other AP is not notified in S1005 (NO in S1005), the first AP 32 transmits the parameter share processing completion notification to the target device (S1009), and the processing is ended.

In S1006, if the first AP 32 judges to have the proxy function (YES in S1006), the smartphone 33 notifies the target device about that the first AP 32 has the proxy function, and the processing goes to S1007. In contrast, in S1006, if it is judged that the first AP 32 does not have the proxy function (NO in S1006), the smartphone 33 notifies the target device (about) that the first AP 32 does not have the proxy function and about the parameter share processing completion notification, and the processing is ended.

In S1007, the first AP 32 transmits the identification information on the first AP 32 as the providing device information to another AP (for example, second AP 34), and executes the parameter share processing with respect to the second AP 34. When the parameter share processing with respect to the second AP 34 is ended, the first AP 32 judges whether or not still another AP, with which the parameter share processing is to be executed, remains (S1008). If still another AP remains, the parameter share processing is executed with that AP (for example, third AP 35) (S1007). If there is no AP, with which the parameter share processing is to be executed, the first AP 32 transmits the completion notification to the target device (the target device that has executed the parameter share processing in S1004), and the processing is ended (S1009). The completion notification transmitted in this case may include information indicative of that the parameter share processing with the other AP is completed.

In the above-described third embodiment, the device provided with the communication parameter (for example, the first AP 32) provides the communication parameter to another access point (for example, the second AP 34, the third AP 35) instead of the smartphone 33. Accordingly, the efficiency of the processing in the entire communication system can be increased. Also, the load of the smartphone can be distributed. In the third embodiment, the example has been described in which the communication parameter is set at the three APs; however, the number of APs is not limited to three, and this embodiment can be applied to two or more APs.

Modifications

In the respective embodiments described above, each message transmitted between the smartphone and the access point may be transmitted by using, for example, an action frame based on the IEEE 802.11 standard. For example, all or a portion of the providing device information, the parameter share processing start request, the parameter share processing start response, and the parameter share processing completion notification may be transmitted by using the action frame based on the IEEE 802.11 standard.

Also, the above-described embodiments may be properly combined. For example, a user may select one of the respective embodiments with his/her operation so that the smartphone operates according to the selected embodiment. For example, the display unit of the smartphone may display a screen that allows the user to select the mode of operation from among "AP sequential setting mode (first embodiment)," "AP collective setting mode (second embodiment)," and "proxy request mode (third embodiment)," and the user may select one of these.

In the above-described embodiments, the configuration has been described in which the information for setting the communication parameter is transmitted between the devices by using the image of the QR code. However, instead of capturing the QR code, wireless communication, such as NFC or Bluetooth (registered trademark), may be used. Alternatively, wireless communication, such as IEEE 802.11ad or TransferJet (registered trademark), may be used.

The QR code to be read is not only the QR code displayed on the display unit, but may be also a QR code attached to a housing of a communication device in a manner written on a seal etc., or may be directly written on the housing. Alternatively, the QR code to be read may be written on an operation manual, or an attachment such as packaging like a cardboard carton at the sale of the communication device.

Also, without limiting to the QR code, a one-dimensional barcode, or a two-dimensional code other than the QR code may be used. Also, instead of machine-readable information, such as the QR code, information in a user-readable form may be used. An image of the user-readable information can be captured and analyzed.

Also, in each embodiment, the case has been described in which the communication is made between the devices by the wireless LAN communication in conformity with IEEE 802.11. However, it is not limited thereto. For example, a wireless communication medium, such as wireless USB, MBOA, Bluetooth (registered trademark), UWB, ZigBee, or NFC, may be used for communication. In this case, MBOA is an abbreviation for Multi Band OFDM Alliance. Also, UWB includes wireless USB, wireless 1394, WINET, and so forth.

Also, in each embodiment, the case has been described in which the wireless parameter is provided at the access point of wireless LAN. However, it is not limited thereto. For example, a case of providing a wireless parameter to a device operable as a group owner of Wi-Fi Direct (registered trademark) that serves as a function corresponding to an access point may be included.

The communication device is not limited to the smartphone or the access point dedicated device, and may include a PC, any of various smart devices, a digital camera, a printer, and any one of various digital home electrical products.

The present invention can be realized by processing of supplying a program that realizes at least one function of the above-described embodiments to a system or a device through a network or a storage medium, reading out the stored program by at least one processor in a computer of the system or the device, and executing the read program. Also, the present invention can be realized by using a circuit (for example, ASIC) that realizes at least one function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication device comprising:
    a first acquisition unit configured to acquire information relating to a first access point from a captured first image;
    a second acquisition unit configured to acquire information relating to a second access point from a captured second image;
    a first execution unit configured to execute communication parameter share processing for sharing a communication parameter, required for establishing a wireless network, with the first access point by using the information acquired by the first acquisition unit;
    a second execution unit configured to execute the communication parameter share processing, required for establishing a wireless network, with the second access point by using the information acquired by the second acquisition unit; and
    a control unit configured to limit acquisition of the information by the second acquisition unit until completion of the communication parameter share processing executed by the first execution unit.

2. The communication device according to claim 1, further comprising:
    an image capturing unit configured to capture an image,
    wherein the first acquisition unit acquires the information relating to the first access point by analyzing the image captured by the image capturing unit, and
    wherein the second acquisition unit acquires the information relating to the second access point by analyzing the image captured by the image capturing unit.

3. The communication device according to claim 1, wherein the information relating to the first access point is information on a public key held by the first access point and identification information on the first access point, and the communication parameter share processing is executed by using the public key and the identification information.

4. The communication device according to claim 1, wherein the communication parameter is a communication parameter of a wireless network established by the first access point and a wireless network established by the second access point.

5. The communication device according to claim 1, wherein the communication parameter includes at least one of a network identifier of the wireless network, an encryption scheme, an encryption key, an authentication scheme, and an authentication key.

6. The communication device according to claim 1, wherein the wireless network is a network of a wireless local area network in conformity with IEEE 802.11 series.

7. The communication device according to claim 2, wherein the image includes a barcode or a two-dimensional code.

8. A communication method comprising:
    firstly acquiring information relating to a first access point from a captured first image;
    secondly acquiring information relating to a second access point from a captured second image;
    executing communication parameter share processing, required for establishing a wireless network, with the first access point by using the information acquired in the first acquisition;
    executing the communication parameter share processing, required for establishing a wireless network, with the second access point by using the information acquired in the second acquisition; and
    limiting acquisition of the information acquired in the second acquisition until completion of the executing of the communication parameter share processing, required for establishing a wireless network, with the first access point.

9. A non-transitory computer-readable storage medium storing a program for causing a communication device to execute processes, the processes comprising:
    firstly acquiring information relating to a first access point from a captured first image;
    secondly acquiring information relating to a second access point from a captured second image;
    executing communication parameter share processing, required for establishing a wireless network, with the first access point by using the information acquired in the first acquisition;
    executing the communication parameter share processing, required for establishing a wireless network, with the second access point by using the information acquired in the second acquisition; and
    limiting acquisition of the information acquired in the second acquisition until completion of the executing of the communication parameter share processing, required for establishing a wireless network, with the first access point.

10. The communication device according to claim 1, wherein
    the control unit performs control such that a mode of capturing an image is not activated until the completion of the communication parameter share processing executed by the first execution unit.

* * * * *